(12) United States Patent
Basani et al.

(10) Patent No.: US 7,747,741 B2
(45) Date of Patent: *Jun. 29, 2010

(54) METHOD AND APPARATUS FOR DYNAMIC RESOURCE DISCOVERY AND INFORMATION DISTRIBUTION IN A DATA NETWORK

(75) Inventors: Vijay R. Basani, Nashua, NH (US);
Krishna Mangipudi, Nashua, NH (US);
Lynne M. Murach, Methuen, MA (US);
Leroy R. Karge, Leominster, MA (US);
Vitaly S. Revsin, Andover, MA (US);
Azer Bestavros, Wayland, MA (US);
Mark E. Crovella, Scituate, MA (US);
Domenic J. LaRosa, Atkinson, NH (US)

(73) Assignee: Net App, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/046,198

(22) Filed: Mar. 11, 2008

(65) Prior Publication Data

US 2008/0177861 A1 Jul. 24, 2008

Related U.S. Application Data

(63) Continuation of application No. 10/828,431, filed on Apr. 20, 2004, now Pat. No. 7,346,682, which is a continuation of application No. 09/545,337, filed on Apr. 7, 2000, now Pat. No. 6,748,447.

(51) Int. Cl.
*G06F 15/173* (2006.01)
(52) U.S. Cl. .................. 709/224; 709/238; 709/219
(58) Field of Classification Search .......... 709/201, 709/244, 238, 219, 231, 233, 227, 214, 226, 709/224; 718/102, 105; 714/4; 707/10; 726/14

See application file for complete search history.

(56) References Cited

U.S. PATENT DOCUMENTS 5,355,371 A 10/1994 Auerbach et al.

(Continued)

FOREIGN PATENT DOCUMENTS

WO WO 99/55042 10/1999

OTHER PUBLICATIONS

Deering, S. "Host Extensions for IP Multicasting", Web Page Printout: http://www.es.net/pub/rfcs/rfc1112.txt, pp. 1-15, Aug. 1989.

(Continued)

*Primary Examiner*—Le Luu
(74) *Attorney, Agent, or Firm*—Cesari and McKenna, LLP

(57) ABSTRACT

A method for distributing information to a plurality of servers is described. The information is transmitted from a control manager server to a first group leader server. The first group leader server transmits the information to a second group leader server. The second group leader server requests instructions from the control manager server. The second group leader server then transmits, in response to the instructions, the information to a further group leader server. The first group leader server transmits the information to back end servers belonging to a group of the first group leader server. The second group leader server transmits the information to back end servers belonging to a group of the second group leader server. The further group leader server transmits the information to back end servers belonging to a group of the further group leader server.

12 Claims, 7 Drawing Sheets

U.S. PATENT DOCUMENTS

| | | | |
|---|---|---|---|
| 5,541,927 A | | 7/1996 | Kristol et al. |
| 5,553,083 A | | 9/1996 | Miller |
| 5,675,802 A | | 10/1997 | Allen et al. |
| 5,699,501 A | | 12/1997 | Badovinatz et al. |
| 5,727,002 A | | 3/1998 | Miller et al. |
| 5,898,686 A | | 4/1999 | Virgile |
| 5,920,701 A | | 7/1999 | Miller et al. |
| 5,983,005 A | | 11/1999 | Monteiro et al. |
| 5,991,306 A | | 11/1999 | Burns et al. |
| 6,006,254 A | | 12/1999 | Waters et al. |
| 6,065,058 A | * | 5/2000 | Hailpern et al. ............. 709/231 |
| 6,070,191 A | * | 5/2000 | Narendran et al. .......... 709/226 |
| 6,134,596 A | * | 10/2000 | Bolosky et al. ............. 709/233 |
| 6,141,759 A | * | 10/2000 | Braddy ........................ 726/14 |
| 6,223,202 B1 | * | 4/2001 | Bayeh ........................ 718/102 |
| 6,256,747 B1 | * | 7/2001 | Inohara et al. ................. 714/4 |
| 6,269,080 B1 | | 7/2001 | Kumar |
| 6,317,778 B1 | * | 11/2001 | Dias et al. ................... 709/214 |
| 6,553,413 B1 | | 4/2003 | Leighton et al. |
| 6,625,750 B1 | * | 9/2003 | Duso et al. .................... 714/11 |
| 6,728,748 B1 | * | 4/2004 | Mangipudi et al. .......... 718/105 |
| 6,748,447 B1 | | 6/2004 | Basani et al. |
| 7,225,249 B1 | * | 5/2007 | Barry et al. ................. 709/227 |
| 7,346,682 B2 | | 3/2008 | Basani et al. |
| 2002/0091697 A1 | * | 7/2002 | Huang et al. .................. 707/10 |

OTHER PUBLICATIONS

Miller, K. et al. "StarBurst Multicast File Transfer Protocol (MFTP) Specification", Web Page Printout: http://www.kashpureff.org/nic/drafts/draft-miller-mftp-spec-02.txt.html, pp. 1-7, Aug. 2, 2000.

F5 Networks Inc. "F5 Products Deliver Support and Enforcement of Internet Policy Management", Web Page Printout: http://www.f5.com/solutions/whitepapers/policymanage.html, pp. 1-5, Feb. 12, 2000.

F5 Networks Inc. "Global Data Management", Web Page Printout: http://www.f5.com/globalsite/index.html, pp. 1-5, Feb. 10, 2000.

F5 Networks Inc. "F5 Networks Will Ship Global/SITE Controller for Data Management of Distributed Internet Servers", Web Page Printout: http://www.f5.com/news/releases/release100499.html, pp. 1-3, Feb. 11, 2000.

Starburst Software, "Starburst Omnicast", Web Page Printout: http://www.starburstsoftware.com/products/omnicast2.pof, pp. 1-4, Mar. 2000.

Technology Brief, "One-to-Many Content Distribution in a Campus Environment", Web Page Printout: starburstsoftware.com, Feb. 12, 2000.

"Inktomi Content Delivery Suite", Web Page Printout: http://www.inktomi.com/products/network/traffic/tech/cdswhitepaper, 7 pages, Dec. 17, 1999.

* cited by examiner

METHOD AND APPARATUS FOR DYNAMIC RESOURCE DISCOVERY AND INFORMATION DISTRIBUTION IN A DATA NETWORK

RELATED APPLICATION

This application is a continuation of U.S. application Ser. No. 10/828,431, filed Apr. 20, 2004, now issued as U.S. Pat. No. 7,346,682 on Mar. 18, 2008, which is a continuation of U.S. application Ser. No. 09/545,337 filed Apr. 7, 2000 U.S. Pat. No. 6,748,447, issued Jun. 8, 2004, which is incorporated herein by reference.

BACKGROUND OF THE INVENTION

1. Field of the Invention

This invention is directed towards data communication, and more particularly towards reliable and efficient distribution of data to large numbers of network locations.

2. Background Information

Digital content creators are users who utilize workstations or other computers to create or digitize information in preparation for publication as "content." When such content is to be shared with or published to a number of other computer users using a wide area network (WAN), such as the World Wide Web ("the Web"), reliability, security, and efficiency become major issues. Reliability refers to the ability to ensure that the data was received without debilitating errors. Latency, the measure of how much time it takes to deliver data, suffers when finite resources become overloaded, whether in the respective processors, intermediate storage or a communications link. Inefficiency may arise because multiple copies of data have to be retransmitted between the same source(s) and destination(s) due to lost or garbled messages. As the number of recipient sites grows, issues of latency and efficiency complicate the architecture.

Inefficient communication protocols for reliable data exchange amplify problems in real-time systems where latency directly determines user satisfaction.

Historically, manual or customized operations were the only solutions available for distributing new or modified content, as networks expanded and data-distribution needs changed.

However, such solutions have the disadvantage of not being flexible enough to handle real-time load balancing. Temporary outages of system components can also cause havoc in a statically defined distribution method. Similarly, manual or customized actions become increasingly labor-intensive as data files proliferate and the number of servers increases exponentially, as seen in the recent growth of the Internet. In particular, the operation of the "Web" requires massive data management and distribution. Many users expect instantaneous access, worldwide, to the fastest source of the best data available at any given moment. This puts a heavy burden on service providers for better information control and infrastructure management.

One well known solution to reduce access latency by large numbers of users is to distribute content to file servers at numerous remote sites, and then direct user access requests to those servers. Multiple copies of content must then be tracked and synchronized in order to provide uniformity and consistency of data among all users. Many network content publishers obtain network file server services from a variety of geographically dispersed service providers. Manual coordination with each service provider for content distribution increases complexity and creates more room for error and delay.

To manage the problem of rapid content distribution from a master copy, several companies have experimented with or proposed semi-automated systems for streamlining the distribution process. These solutions are typically targeted at one of three critical points: "content management;" reliable and efficient distribution across WANs; or the local replication and synchronization across multiple servers within a Local Area Network (LAN). Content management refers to the methods of ensuring that only the necessary data is sent, that the remote copies are synchronized, and that file transmission is properly compressed and encrypted, as necessary.

One example of a content management system is the Content Delivery Suite (CDS) product distributed by Inktomi Corporation of Foster City, Calif., as described at www.inktomi.com/products/network/traffic/tech/cdswhitepaper. According to the available documentation, CDS management components determine when data content changes within file systems on a 'staging server,' and then send updated files to 'CDS Agents' on distributed web-servers. Once the updated files are received at the web servers, the CDS triggers all web servers to take the updated files 'live' simultaneously. This particular solution suffers from numerous disadvantages. Sending entire files for an update is relatively inefficient, when only a small amount of data may have actually changed out of millions of bytes in the file. File transmission to each remote server originates from a single, central point, and all remote servers must wait for the others accessing the same central source to receive and acknowledge the correct data before the new content goes 'live.' The referenced implementation lacks the ability to intelligently schedule distribution or replication of pertinent content to different parts of the network according to the user's needs.

Another example of a system for managing content distribution is the global/SITE product of F5 Networks, Inc., of Seattle, Wash., as described at http://www.f5.com/globalsite/index.html. The available documentation indicates that global/SITE is an additional computer appliance that is added to a LAN and a central site. The specialized hardware and software at the central site automatically replicates and transfers only those files that have changed (i.e., new, updated, or deleted). Changes to updated files include only the changed portions, thus reducing the wasted transmission load. However, disadvantageously, the addition of separate hardware and software at each site inherently reduces reliability, since there are more components subject to maintenance and potential failure. In fact, the global/SITE system becomes a single point of failure which could cripple an entire site if the unit is rendered inoperable, whether accidentally or maliciously. Installation, configuration and maintenance of these additional units will also require on-site support and customized spare parts.

One approach to schedule management is proposed in U.S. Pat. No. 5,920,701 ("the '701 patent"), issued Jul. 6, 1999. The '701 patent teaches a system in which data transfer requests and schedules from a content source are prioritized by a network resource scheduler. Based upon the available bandwidth and the content priority, a transmission time and data rate is given to the content source to initiate transmission. The scheduler system requires input that includes information about the network bandwidth, or at least the available bandwidth in the necessary content path. This has the disadvantage of requiring additional complexity for determination of network bandwidth at any given moment. It also requires a method for predicting bandwidth that will be available at some transmission time in the future. Furthermore, a content distributor is required to provide a "requested delivery time deadline," which complicates content management by requiring each content distribution requester to negotiate reasonable transmission times for each piece of content. This approach is focused entirely on bandwidth allocation, and fails to address issues of network dynamics, such as regroupings of the target servers for load-balancing. Whatever efficiency may have been derived from the '701 is substantially completely lost when the entire content must be retransmitted to an additional server, making a huge waste of bandwidth for every node in the multicast path which already received the file.

Each of these alleged management and distribution solutions relies upon file replication and transmission techniques that remain closely tied to one on-one file transfers to each individual server. The problem grows geometrically as the number of servers increases and multiple copies of selected files are required at each remote web site.

The ubiquitous Internet Protocol (IP) breaks messages into packets and transmits each one to a router computer that forwards each packet toward the destination address in the packet, according to the router's present knowledge of the network. Of course, if two communicating stations are directly connected to the same network (e.g., a LAN or a packet-switching network), no router is necessary and the two stations can communicate directly using IP or any other protocol recognized by the stations on the network. A "web farm" or "cluster" is an example of a LAN on which multiple servers are located. In a cluster, there is typically a front-end connected to the Internet, and a set of back-end servers that host content files.

LANs, by their nature, are limited in their ability to span long distances without resorting to protocol bridges or tunnels that work across a long-distance, point-to-point link. Since most LAN protocols were not designed primarily for Wide Area Networking, they have features that can reduce reliability and efficiency of the LAN when spanning a WAN. For example, a station on a LAN can send a multicast IP packet simultaneously to all or selected other stations on its LAN segment very efficiently. But when the LAN is connected to an IP router through the Internet to another router and other LAN segments, the multicast becomes difficult to manage, and reliability suffers. In particular, most Internet routers only handle point-to-point, store-and-forward packet requests and not multicast packet addresses. This puts the burden on the sender to laboriously transmit a separate copy to each intended remote recipient, and to obtain a positive acknowledgement of proper receipt.

One proposed solution, described in U.S. Pat. No. 5,727, 002, issued Mar. 10, 1998, and in U.S. Pat. No. 5,553,083, issued Sep. 3, 1996, relies upon the limited multicast capabilities of IP to reach large numbers of end-points with simultaneous transmissions. Messages are broken into blocks, and blocks into frames. Each frame is multicast and recipients post rejections for frames not received, which are then retransmitted to the multicast group until no further rejections are heard. A disadvantage of the disclosed method is that it relies upon either a network broadcast of data at the application layer, or a multicast IP implementation based upon the standardized RFC 1112 Internet specification. Broadcast is an extremely inefficient protocol in all but very limited circumstances, since it requires that each and every recipient process an incoming message before the recipient can determine whether or not the data is needed. Even multicast IP has the disadvantage of being based upon the unwarranted assumption that the Internet routers will support the standard multicast feature, which is actually very rare.

Under limited condition, i.e., where the Internet routers actually support the IP multicast feature, a packet can be sent simultaneously to many receivers. Building upon IP multicast, Starburst Software, Inc., of Concord, Mass. (the assignee of the '002 and '083 patents mentioned above), has created the Starburst OmniCast product, described at http://www.starburstsoftware.com/products/omnicast3.pdf and in a Starburst Technology Brief. As described, the OmniCast product relies upon the router to replicate and forward the data streams to multiple destinations simultaneously. This has the disadvantage of not being applicable to most of the present Internet, or in any private network that does not implement multicast according to the standard. Alternatively, using a so-called 'FanOut' feature, the OmniCast application itself replicates the packets and forwards them to multiple FanOut sites which then use local multicast features for further distribution. Each FanOut server is configured to accept certain multicast addresses. The FanOut closest to the source replicates the packets and sends them to a configured list of addresses using a unicast protocol, and encapsulates the multicast address for further use by downstream FanOuts. This solution has the disadvantage of requiring configuration and maintenance of static lists of servers in each FanOut unit. It also does not provide any flexibility for changing which back-end servers correspond to each multicast address. The central FanOut unit is also burdened with sequential transmission of the first message to every remote FanOut unit, using a unicast protocol.

Another disadvantage of existing implementations is that they fail to deal with much of the dynamic nature of the Internet, in which servers are reallocated from time to time, or new servers are added for performance considerations. Current implementations rely upon manual, error-prone coordination between groups of personnel who create content and those who manage the network resources.

Some large-scale distributed networks use processor group leaders to manage distribution and communication of data. However, disadvantageously, group leaders can be lost, such as when the system providing that service is taken offline or otherwise becomes unavailable. In one approach to recovery of a group leader in a distributed computing environment, described in U.S. Pat. No. 5,699,501, issued Dec. 16, 1997, a system of servers has a group leader recovery mechanism in which a new group leader can be selected from a list of servers, in the order in which processors join the group. The list is distributed via multicast or held in a name server, and is accessed whenever a new group leader is needed. The disadvantage of this approach is that each server has the same chance of becoming the leader, even though there may be numerous reasons to make a better selection.

Another disadvantage of existing systems is that load-balancing processes or service-level monitors, that may be operating simultaneous with content distributors, typically have no way to directly determine whether a particular server has the most recent version of content. Similarly, in situations where content is transparently cached in alternate servers, someone has to remember to update (i.e., purge) the cache when there are changes to the cache. Most cache implementations also have no capability for making efficient updates when changes are small in proportion to the size of the file containing the changes.

SUMMARY OF THE INVENTION

The present invention provides a method and apparatus for efficient and reliable control and distribution of data files or portions of files, applications, or other data objects in large-scale distributed networks. A unique content-management front-end provides efficient controls for triggering distribution of digitized data content to selected groups of a large number of remote computer servers. Transport-layer protocols interact with distribution controllers to automatically determine an optimized tree-like distribution sequence to group leaders selected by network devices at remote sites. Reliable transfer to clusters is accomplished using a unicast protocol in the ordered tree sequence. Once packets arrive at the remote cluster, local hybrid multicast protocols efficiently and reliably distribute them to the back-end nodes for interpretation and execution. Positive acknowledgement is then sent back to the content manager from each cluster, and the updated content in each remote device autonomously goes "live" when the content change is locally completed.

According to the present invention content creators deposit digitized data content on a staging server on the network, for example via the Internet. The staging server and distributions servers can be physically separate computers or could both reside on the same computer. The staging server is interrogated by a distribution server running a content management service known as content control manager ("CCM"), according to configurable policies (such as scheduled updates, events, backups). A browser-based policy management system interacts with the distribution server to establish content management service configurations and content distribution policies. Scheduled content transactions (such as updates, synchronization, replications, backups, restorations, or rollback) are monitored by a scheduler to avoid server conflicts and to minimize network congestion. The scheduler detects scheduled job conflicts and notifies the user to reschedule a job. When a content transaction (or "job") is initiated, a set of necessary directory and file changes are determined, according to configurable policies, along with the commensurate steps needed to carry out the job, known as "assignments."

The content control manager issues assignments to system components for creating or deleting remote server directories and files, and for distributing changed content from the staging server. Remote servers are administratively divided into "content groups." Content Groups are logical groupings of remote servers that will participate in or receive the content distribution, either within a LAN or across WANs. Assignments, which comprise assignment commands and the content data, are then forwarded to dynamically configured cluster Group Leaders ("GLs"). The Group Leader is responsible for overseeing the distribution of the assignment to the remote or BackEnd Servers ("BESs") that are in the Content Group within the GLs network segment. A component on the BES receives and processes the assignment, reporting success or failure back to the Group Leader. The Group Leaders each report the status of the assignment for all of their corresponding BESs to the CCM. The CCM reports the assignment status back to the database and optionally logs the status to a log file. The status can be viewed through the browser-based User Interface. Completed assignments are reported directly to the database, along with the completion status. Failed assignments are rescheduled (or cancelled) according to the current database policies for the corresponding content.

In further accord with the invention, an assignment message contains instructions for creating, moving/copying, removing, or modifying directories or file content on remote servers, including parameters for any required compression and encryption. The assignment itself, or any of its components, can be encrypted prior to transmission to provide for enhanced security, including privacy or integrity, or both. Assignments are dispatched according to a sorted list of group leaders, based on factors such as nearness, processor speed, reliability, or CPU Usage, and according to the content groupings. For a small number of GLs, each GL can be individually and directly addressed by the CCM. However, as the number of network segments grows, a store-and-forward approach becomes much more efficient. According to a distribution mechanism for storing and forwarding content among group leaders, the first selected group leader receives the first assignment from the content control manager (CCM). Before or while carrying out its own assignment, the first group leader (GL) requests instructions for the next GL on the list from the CCM and forwards (that assignment to the next GL. Each GL in turn handles its own assignment for its cluster, reports its status, requests the next GL's assignment from the CCM, and forwards the assignment to the next GL. When all the GLs have received the assignment, the GLs distribute the assignment to their conespondimg BESs. This mechanism permits highly efficient and robust distribution of assignments and data content from the CCM to each required GL using a store-and-forward tree structure.

In further accord with a mechanism for distributing content to dynamically elected group leaders, a dynamic tree structure is maintained by the system based upon real-time nominations of GLs and their respective registration of group members within each cluster, reported to and processed by the CCM. The members of a group elect a group leader according to real-time and administration selection criteria. The elected GL then reports its registered group membership and performance parameters to the CCM. The CCM processes these reports and derives an optimally sorted list of GLs for distribution of assignments. The list of clusters for distribution of assignments is arranged in an order according to dynamic network factors such as location. There is a user interface mechanism to allow a system administrator to override (or configure) this election and arrangement behavior and to artificially define a static behavior.

In further accord with the invention, once a GL has received an assignment destined for its own members, and no further GLs require distribution of the assignment, each GL uses a reliable Multicast Content Transport Protocol (MCTP) to distribute the assignment to each of the BESs in the addressed group. Once the BES receives the assignment, a Content Interpreter (CI) parses the assignment and carries out the distribution commands within each BES. The GL then obtains individual status reports from each group member and sends a group distribution report back to the CCM. The GL is also responsible for notifying the CCM when a member joins or leaves the group.

Advantages of the present invention include provision of a system and method for efficient transmission of data files. The automated system is highly scalable and avoids the unreliability, latency and inefficiencies of implementations heretofore known. Single points of failure are largely eliminated in the method and apparatus according to the invention in which a plurality of group leaders are elected for distributing content to a plurality of back-end content servers. Assignments are created and undertaken in a manner that facilitates optimal and intelligent distribution or replication of content to different parts of a network, without unnecessarily sending unchanged data.

Similarly, the directed assignment distribution mechanism decreases network load and wasted bandwidth caused by multicasting messages to uninvolved servers. A dynamic tree structure alleviates the administrative costs of manually detecting network server allocations in order to properly address updates.

The content distribution mechanism according to the invention permits highly efficient and robust distribution of assignments and data content from the CCM to each required GL using the store-and-forward tree structure. Dynamic reconfiguration of the content distribution mechanism improves overall system performance by automatically selecting the best available resources to carry out the necessary content distribution tasks. The inventive mechanism is freed from reliance upon any features of IP multicast in Internet routers without sacrificing scalability. The inventive method and apparatus using standard point-to-point communication protocols also avoids potential problems with non-uniform multicast implementations in the WAN. Content distribution via store-and-forward through a dynamic tree structure according to the invention has the advantage of separating the time-critical process of directed content distribution from the bulk of the network overhead generated by dynamic reconfiguration. Grouping remote servers as content targets according to content-type and administrative inputs provides the advantage of eliminating manual configuration and reconfiguration efforts and the occurrence of configuration-related errors in a dynamic network. The ability to carry out the content distribution on standard server hardware, using standard network interface software, permits substantial savings in capital costs, configuration, and maintenance that would be required of specialized hardware.

Furthermore, content distribution management is freed of much of the overhead related to reconfiguration of firewalls at each remote site. Selected message encryption and automated content compression further increase distribution security and efficiency. Scheduler software implemented in the apparatus and method according to the invention reduces unnecessary conflicts in distribution timing. The scheduler also provides significant improvements in synchronization of content received by groups of remote servers. Use of a lightweight, yet robust multicast protocol in the final LAN segment maximizes the efficiency in a web farm where multiple servers can simultaneously receive the same content updates without having to individually transmit a separate copy to each one sequentially. Back-end reporting to the central content control manager ensures a high degree of synchronization among all targeted servers, network-wide, without requiring that any individual back-end server wait for signals from any other back-end server. Graphical user interface to the content distribution manager simplifies operations by reducing repetitive and error-prone manual steps. The automatic discovery feature of the invention also serves to minimize configuration and management efforts by performing periodic updates to the lists of network segments and their corresponding BESs through communication between the GLs and the CCM. The invention also dovetails with existing performance-oriented products so that service-level reporting can be generated. The content mover can interface with other load-balancing products to provide information about new or removed resources without requiring labor-intensive and error-prone manual reconfigurations. Similarly, the Content Mover can interface with the load-balancing products to instruct the load balancers to remove a BES or a cache from their rotation lists when a BES failed to receive or successfully process and assignment. This allows re-direction of load-balanced requests to only those servers that have the most valid and up-to-date content.

BRIEF DESCRIPTION OF THE DRAWINGS

The foregoing and other features and advantages of the present invention will be more fully understood from the following detailed description of illustrative embodiments, taken in conjunction with the accompanying drawings in which.

DETAILED DESCRIPTION

Figure 1:
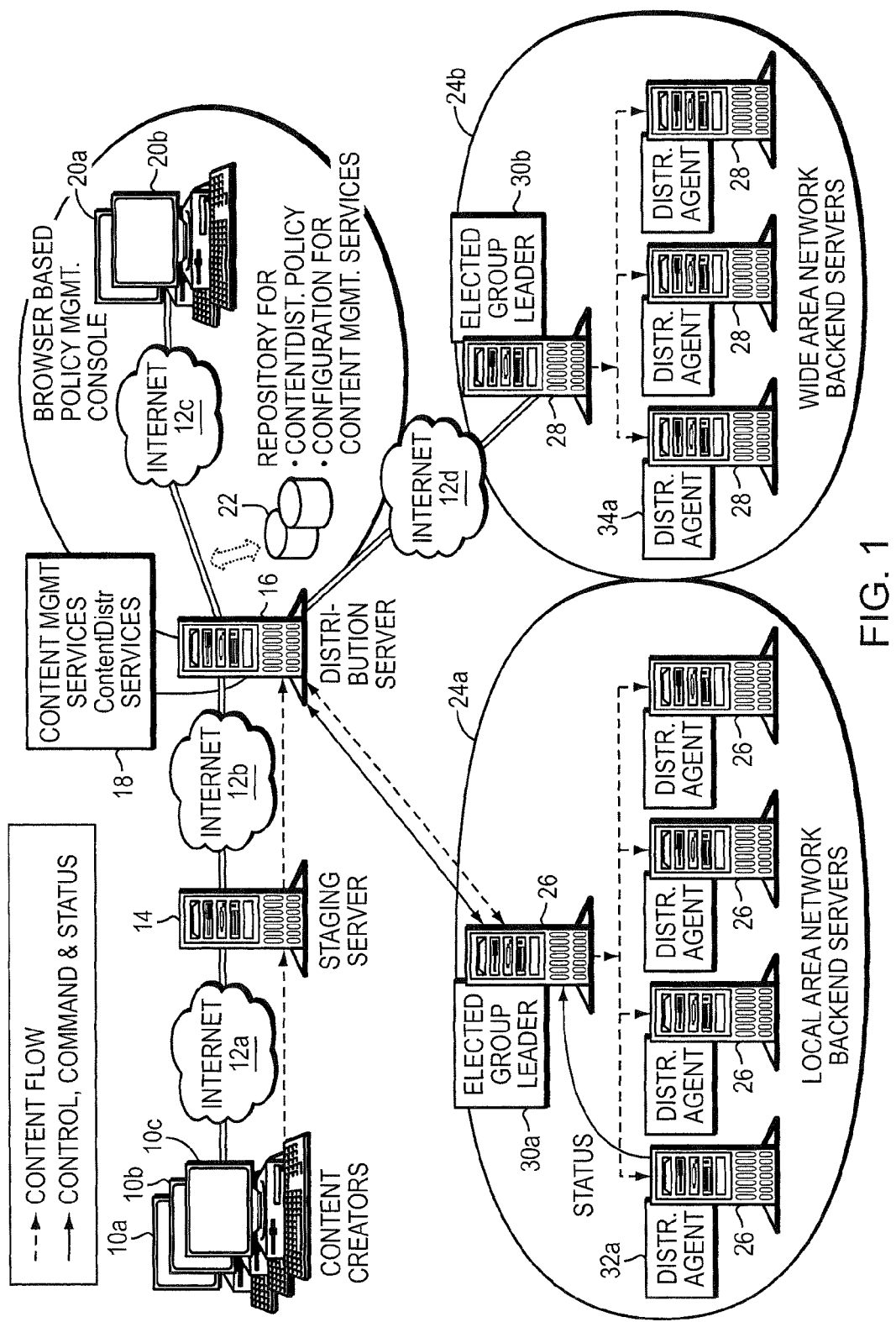
FIG. 1 is a block diagrammatic overview of a system architecture according to the invention, in an Internet context.

The architecture of the present invention, an illustrative embodiment of which is diagramed in FIG. 1, addresses the need for reliable and efficient distribution of digitized data from a single source to large numbers of dynamically networked recipients. Remote customers or content creators of the distribution method and apparatus use their computers 10 to submit their final content changes to a specified staging server 14. A distribution server 16, having content mover and management functions 18, interacts with servers 26, 28 constituting elected group leaders 30 for distributing content or content changes to distribution agents 32, 34 in each cluster 24. Once the content or change distribution is complete, users can begin to access the updated content from any of the servers 26,28. User access to content on a given server can be efficiently managed, according to service level agreements, by a completely independent load-balancing method and apparatus, such as are known in the art.

Different types and sizes of digitized information files such as text, photos, videos, voice, or interactive games can be more efficiently managed and more efficiently accessed by content users of the Internet if the content is intelligently placed on a large number of distributed sites. Two distributed sites 24A, 24B are illustrated, each containing a number of file servers 26, 28.

Digital content creators use workstations or other computers 10 to create or digitize information in preparation for publication as "content," such as on the World Wide Web. Content creators may be for example publishers of voluminous periodicals, or real-time information feeds such as stock quotations or auction catalog offerings. The final content, generally in the form of completely new content or changed content, is moved to the staging server 14 by any known and convenient information transfer means, whether automatic or manual, but preferably over a network, such as the Internet 12. The content creators may then test and verify that the content is complete and works properly on the staging server 14 prior to initiating live access by other users in the Internet.

Content is then turned over to the centralized Content Control Manager (CCM) 18, running on the distribution server 16.

The Content Manager according to the invention has a distributed architecture. The major components of the architecture are a front-end administrator interface 20, the Content Control Manager 18, a database 22 for storing policies and configuration information, group leaders 30 for each network segment 24 of recipient backend servers 26, 28, and a distribution agent 32, 34 on each backend server. The front-end administrator interface 20 is a browser based interface effecting the functionality described in detail hereinafter, and accessible to an administrator over the Internet, or directly on a LAN 12c.

The Content Control Manager 18 in this illustrative embodiment is resident on the same physical machine as the staging server 14, however it should be appreciated that it may operate on a separate server (not shown) connected via a network such as a LAN or the Internet 12. It should also be appreciated that any number of machines on the network can be designated as "staging servers" as may be necessary (for example) to service different types of requests, or for different customers, or from different geographic areas.

Administrative inputs for the content mover 18 are obtained from system administrators at the policy management consoles using the administrative interface 20 and stored in the database 22 accessible to the distribution server. Using the management consoles, the system administrators can configure, schedule and monitor various content update jobs and define content groups. The Content Update job is defined as the collection of information that defines what content is to be updated, where it is to be distributed to, when and how often it is distributed, and what policies/rules apply. Content groups are logical groupings of BESs that are serving the same content that will participate in a content update, and are assigned according to file types, ownership, locations, or service levels being offered to subscribers or to users. A content mover assignment comprises all of the necessary instructions to carry out one of the following actions for every relevant backend server: publish, replicate, restore, synchronize, rollback, switch, remove content or publish "hot" content. Designation of "Hot" content is determined through a load-balancer interface whereby the Content Mover is instructed to distribute "flash" (heavily demanded content) to a specified number of BESs. The externally defined load-balancing rules can also be used to trigger content updates, using the content mover, depending upon other externally defined rules determined by the needs of load balancing. In addition, the content mover will handle aborts, file checkpoints, restorations and reconfiguration of content groups of backend servers. The file checkpoints provide a mechanism to create and manage the version of a complete content roll-out. The invention allows the checkpoints to be saved and restored, as further described below.

The database 22 is a centralized repository for storing configuration information, policies, job information, status logs, snapshots and checkpoints. Examples of information that would be stored in the database include what jobs need to be run, what servers will receive the content update, what options have been selected for encryption and compression and what time a job normally runs. To simplify content synchronization, the database also keeps a history log of each assignment run.

Figure 2:
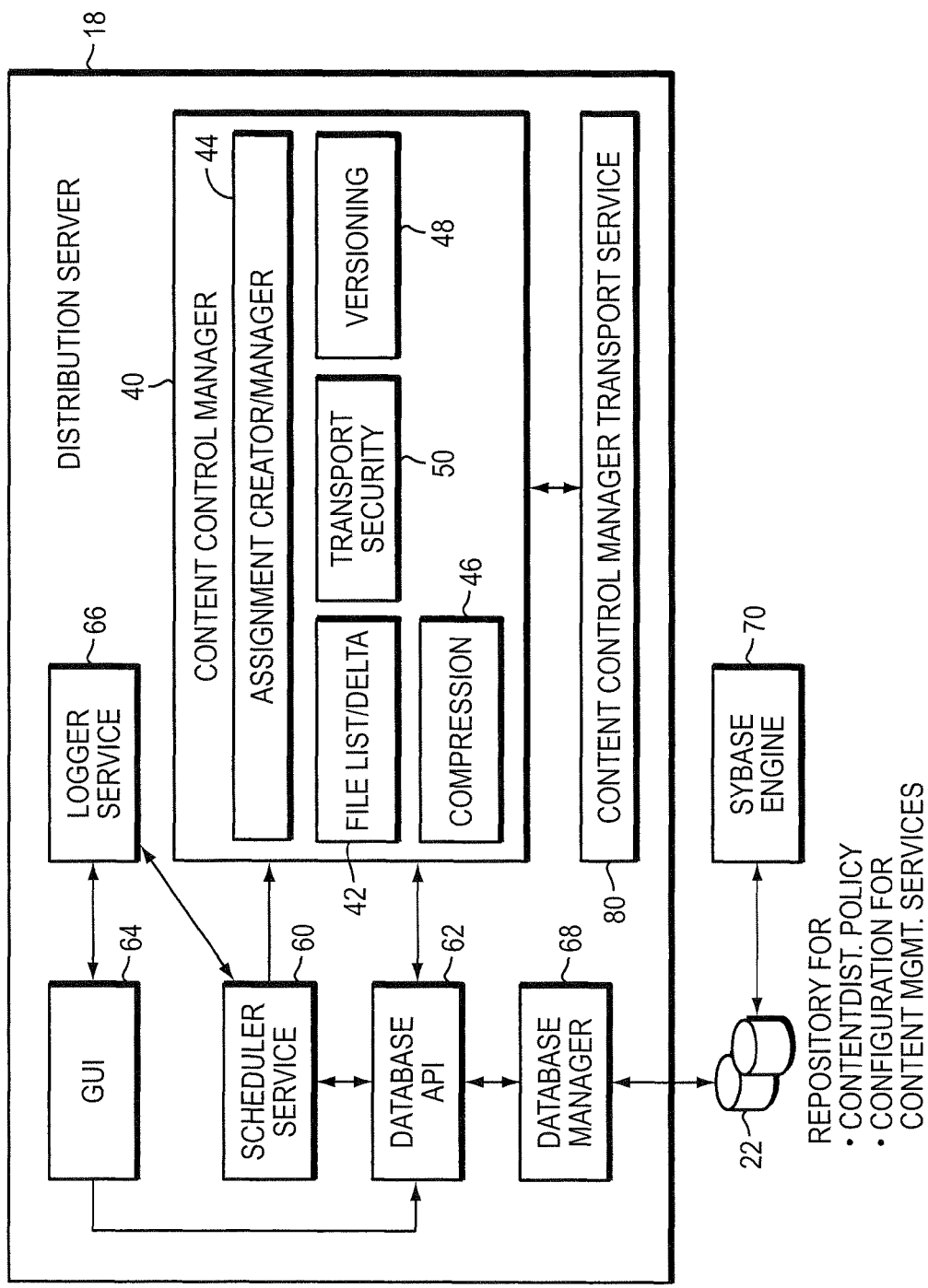
FIG. 2 is a block diagram of modules that comprise a distribution server in the architecture of FIG. 1.

The content control manager (CCM) 40, as illustrated in FIG. 2, is the heart of the content mover system. The CCM in this illustrative embodiment resides on the same machine as the distribution server 16. The CCM oversees the complete process of distributing content from the distribution server to the specified group leaders and monitors further distribution to the BESs. A scheduler 60 notifies the CCM when a job is ready to be run. Scheduled content transactions (such as updates, synchronization, replications, backups, restorations, or rollback) are monitored by the scheduler to avoid server conflicts and to minimize network congestion. Conflicting jobs are queued or cancelled according to administrative inputs to the control database and the console is notified of schedule conflicts. The scheduler is triggered according to events that are stored in the database. The scheduler will, for example, determine whether or not to reschedule the job, if it fails, based on the policy settings in the database.

The Scheduler queries the database looking for assignments that are ready to run. It detects a job that is ready to run by comparing the start time of the assignment to the current time. If the start time is greater than or equal to the current time and has a status of "idle", which means that it is waiting to run, the Scheduler checks to see if any conflicts exists which would preclude the assignment from running properly. If there are no conflicts, the Scheduler sends the assignment to the CCM which, in turn, runs the assignment.

A runtime conflict occurs when a job in progress is distributing to a hosted site on a backend server and a newly detected job needs to distribute to the same hosted site on the same backend server. The Scheduler can detect these conflicts by exploiting the relationship it maintains between content groups, hosted sites, and jobs. A job distributes content to a content group, for example. A content group is comprised of a set of BESs that belong to the same hosted site. Therefore, there is a relationship between a job, a hosted site, and all the BESs participating in a job.

To detect a runtime conflict, the Scheduler first determines all the hosted sites to which all running jobs are presently distributing. If the hosted site of the pending job is different from those currently listed as busy, there is no conflict. If the hosted site is the same as a busy site, the Scheduler builds a list of all the BESs participating in each running job and compares this list to the list of BESs to which the pending job will distribute. If there are any similar BESs, then the Scheduler has successfully found a conflict. As mentioned earlier, if there are no conflicts, the Scheduler sends the assignment to the CCM which, in turn, runs the assignment.

The CCM then communicates with other management services to obtain information about the task details and policy settings of the job. Job information can be repeated on a scheduled basis without having to modify the task details and policies for each instance of the job. The information will include which servers are to be updated (i.e., "content groups"), the source location of the content to be updated, and the rules, policies and options to be enforced. The source location comprises the directory names to include or exclude, and file types to include in the update. The CCM then determines what files have been changed, how much disk space is required, and the exact commands that each server must execute to perform the changes. The CCM also determines if there are enough backend servers 26, 28 capable of doing the update (a "quorum") and will defer or cancel the update if the required quorum is not met.

Similarly, the CCM handles job requests for content synchronization and replication, and enforces the administrative policies for file compression 46, encryption for transport security 50, and version control 48. Security includes, for example, features necessary to encrypt and compute hash checksums for a block of data. Encryption provides data privacy and hash provides for delivery integrity. The entire assignment file, or an updated file component of an assignment can be hashed and encrypted according to user policies and implemented in the CCM, GLs, and BESs, by means that are known in the art, such as MD5 or SHAI hash and a symmetric key cipher such as Data Encryption Standard (DES). File compression can be applied to the entire assignment or selected file components, according to user policies, and implemented by standard means.

Version control 48 in the CCM has three aspects: checkpoint, snapshot, and shadow. A snapshot is made of the assignment details during a content update and is used for synchronizing BESs that did not receive the assignment. The "shadow" copy is a complete, exact replica of the content that exists on the live web-server.

A checkpoint copy is defined as a complete 'safe' copy of a site's content at a particular point in time. The creation of a checkpoint copy will be initiated from the management console. Typically, the system administrator will create a checkpoint copy after a major content update has been distributed and verified. The number of checkpoint copies that are maintained by the content distributor services will be a configurable option. The checkpoint copy will be used to restore a site's content back to a previous 'safe' version. The process of restoring the site to a checkpoint copy will be initiated from the management console. For example, the system administrator will select a checkpoint copy to restore and press a button to initiate the restoration. In addition to the checkpoint(s), the Content Control Manager will maintain a snapshot of all the content update assignments that occur after a checkpoint copy is created. The Content Control Manager will automatically create the SnapShot and update the shadow copy at the end of every successful Content update task. A snapshot consists of: content assignment number (assigned by the Content Control Manager), the content job identification number, a time stamp, and the assignment details. A snapshot does not contain the actual file content.

Figure 3:
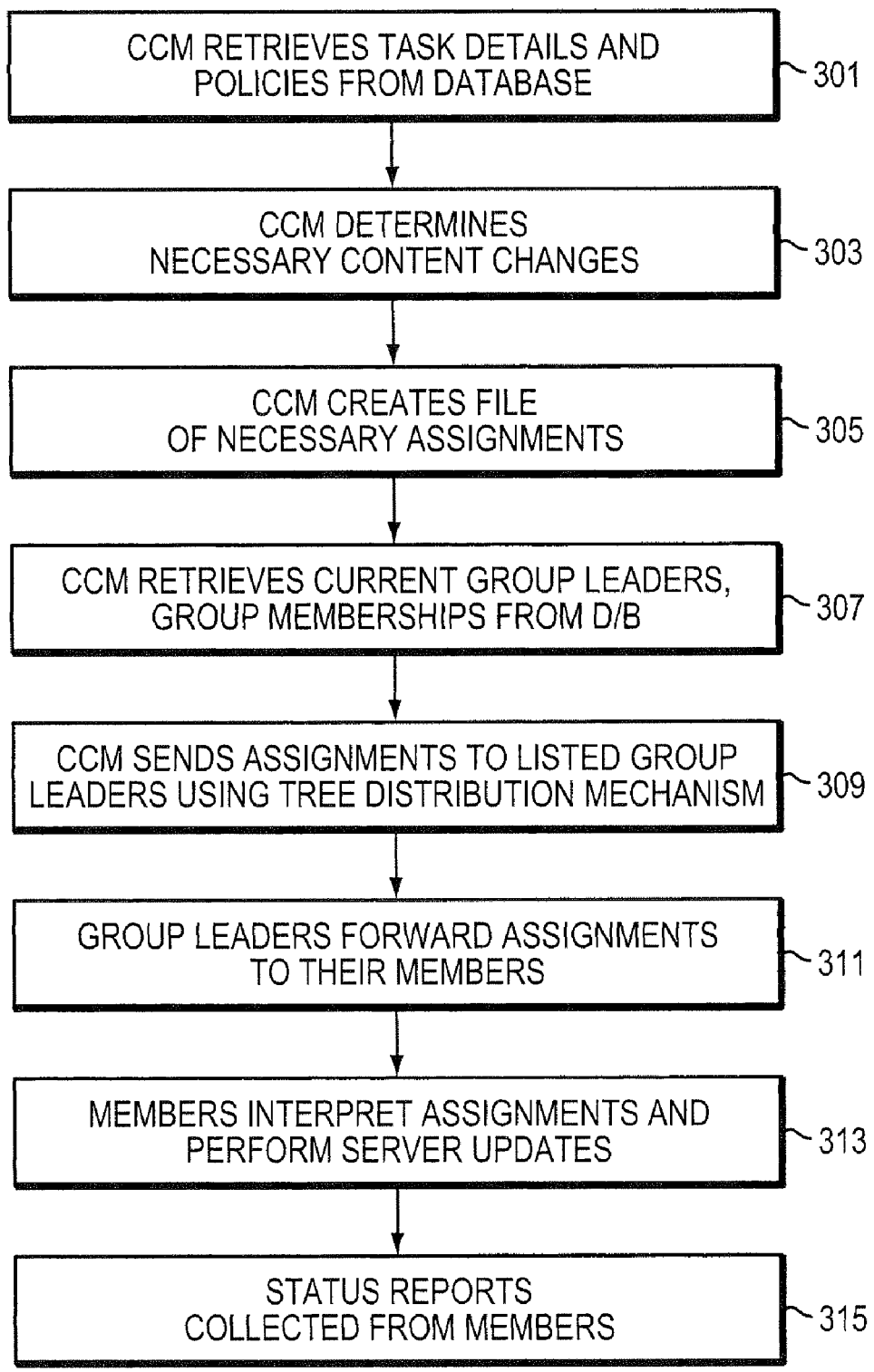
FIG. 3 is a flow diagrammatic overview of the method of distributing content according to the invention.

Generally, the method of distributing content according to the invention is illustrated in FIG. 3 which describe a typical "publish" job. After the scheduler awakens the CCM to initiate a task, the CCM retrieves task details 301 and policies from the database. As a further step in content distribution, the CCM determines which content has changed 303, using a delta function described in further detail below. Alternatively, the CCM can automatically detect changes on the designated staging server and distribute the changed content. Depending upon the file changes or other distribution actions necessary, the CCM creates a file 305 of the necessary assignments, as further described below. The CCM then retrieves a current list of Group Leaders 307, and distributes the assignments 309 to the Group Leaders, and from one Group Leader to the next, as determined by the method detailed herein. Group Leaders each ultimately receive assignments destined for members of their own group, and they forward the assignments 311 to the members of their group participating in the update. Each group member receiving an assignment then interprets the assignment 313 and carries out the actions in the assignment updating its host server. Each group leader then collects the completion status reports 315 from each of the members and relays a consolidated report to the CCM. Each of these steps is discussed in further detail below.

The sequence of events described above and shown in FIG. 3 is for a typical Publish-type assignment. Other assignment types such as Synchronize, Replicate, Restore, and Remove content perform the same sequence of events with certain operational details varying primarily in step 303. For example, a Replicate-type assignment retrieves the task details, policies, name of the host site and the location of the shadow copy from the database 301. As the next step in the replicate process, the CCM invokes the compression module 46 to compress the entire shadow copy contents. The remaining steps for a Replicate-type assignment are the same as shown in FIG. 3.

The CCM will also be awakened by the scheduler to perform jobs such as CreateCheckPoint that do not result in the CCM creating and distributing an assignment file. When the CCM is awakened to perform a CreateCheckPoint job, the CCM retrieves the task details and policies, name of the host site and the location of the shadow copy from the database 301. As the next step in this process, the CCM invokes the compression module 46 to compress the entire shadow copy contents. The CCM then completes this process by invoking the Database API 62 to store the name and location of the CheckPoint file.

The ability to compress files prior to distributing the content will be a configurable option. The Dr will provide the ability for the system administrator to indicate what types of files should be compressed. For example, all .HTML file are to be compressed, and all .GIF files will not be compressed. The de-compression of the file content will occur on every backend server during the process of executing the content assignment.

As part of a content update job, the CCM invokes a file list/delta function 42 that determines the files that have changed on the staging server 14 and that need to be pushed out to the appropriate backend servers. Lists of files at a specified directory path on the staging server will be collected and compared against lists of files/directories at a path known as the shadow copy on the distribution server 16. The CCM invokes a versioning function 48 that maintains the shadow copy for every hosted site as described above. Continuing with the delta function, the two lists of files and directories are compared for differences such as new or deleted file or directory names. Files that are in both lists are then checked to determine when the files were last changed, and a list of changed files is created. The list of changed files is then fed to a delta table builder which identifies the actual bytes changed in the changed file. Any number of file comparison utilities can be used to produce the list of changes to a file, including the standard Unix commands diff and cmp, or WinDiff, or Rsync. Ultimately, a file list/delta table is built, containing a list of changed bytes and their offset locations within the corresponding changed file. This feature results in transmission and distribution of only the changed bytes of data, and offset values. The advantage is a large reduction in transmission time, making the network more efficient.

The CCM contains an assignment creator and manager 44 which responds to scheduler job requests to initiate a distribution job. An "assignment" is a sequence of steps which, when executed, will result in a content transaction being applied on the addressed backend servers. The number of assignments necessary to carry out a job is determined by the size of the content update. An assignment is delivered to a set of GLs and then to a distribution agent or process 32 (FIG. 1) on a backend server where it is parsed to determine what actions to take in furtherance of the job at hand.

To create an assignment, a set of primitives defined by the content mover must be compiled as necessary to carry out the job. For example, to publish a new directory full of files, each destination server's operating system will need to be instructed to create a directory, create each new file name, set the access permissions, and store the contents of each new file from a designated source file. In addition, each file may be compressed or encrypted, or both, either before or after transmission. Similarly, for a content update, a named file must be opened and rewritten with the delta file content, at a specified offset from a specified source file. All data to be written at a server is attached to the assignment in a data file. An assignment thus comprises a set of command primitives, parameters, and an associated data file.

Figure 4A:
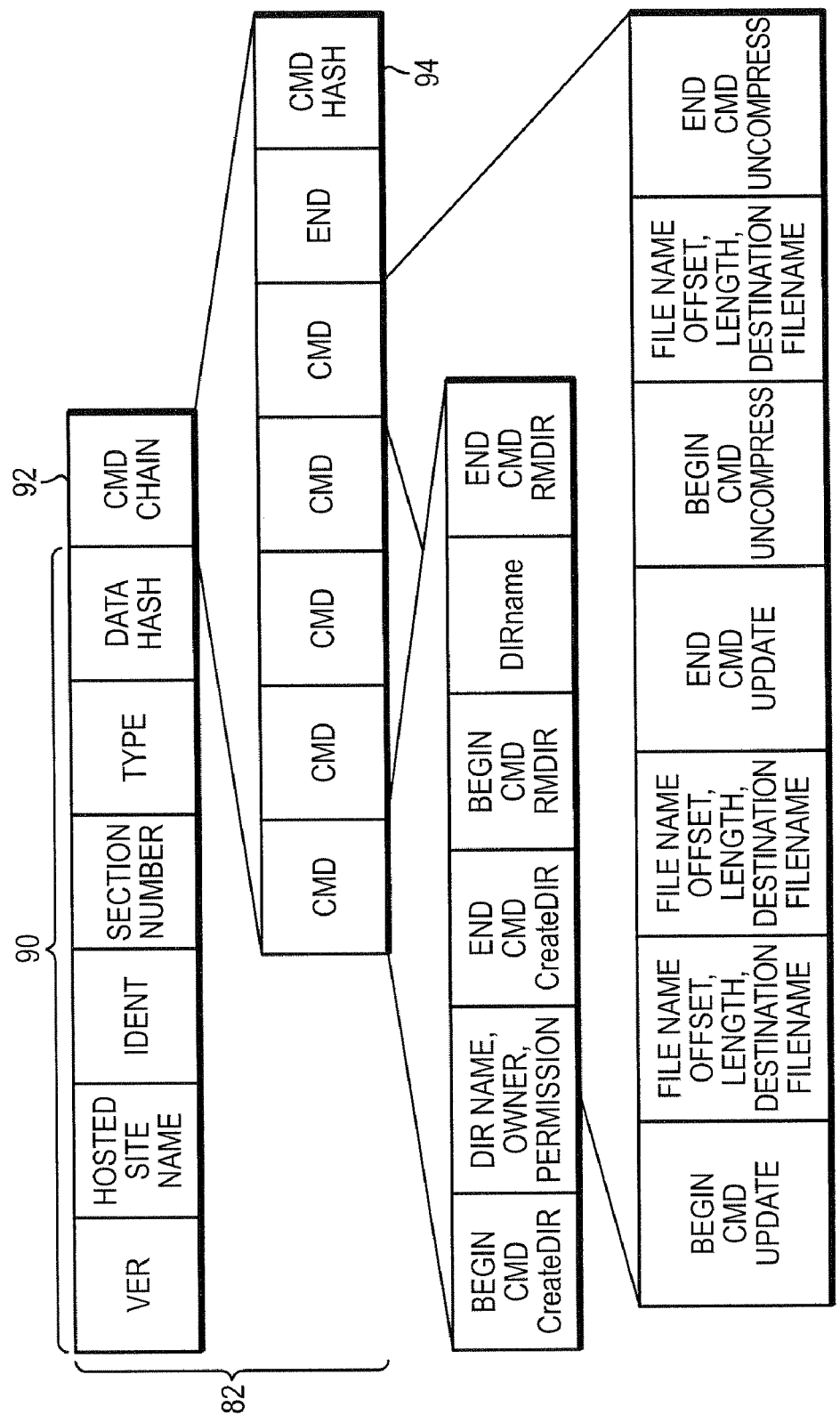
FIGS. 4A and 4B are diagrams of an illustrative embodiment of a distribution assignment data structure according to the invention.

A sample assignment command buffer structure 82 is illustrated in FIG. 4A. The assignment data structure generally includes a header 90, a body 92, and a trailer 94. This is generally the case however an Assignment may consist of just a header, for example a "commit" assignment. An assignment may also just consist of a header and a body. The header 90 contains administrative data such as the assignment serial number, size, type, and hash (checksum) of the corresponding data file, if any. The body 92 of the assignment command buffer contains the set of commands (zero or more) that will be executed in the server, along with the necessary parameters, in the order in which the commands should be executed on the server. The trailer 96 contains a hash of the assignment command sequence.

Figure 4B:
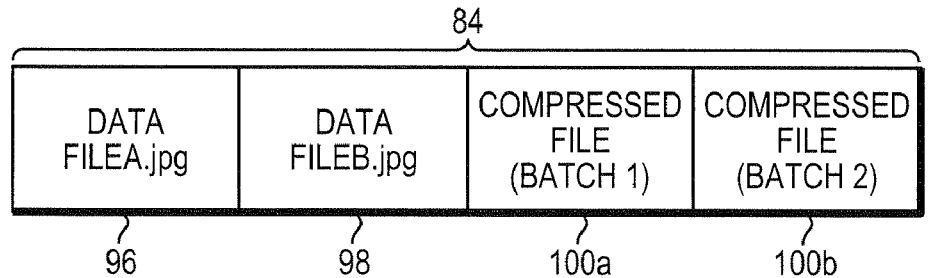

An assignment data file 84, associated with each assignment command buffer 82 having commands requiring additional data, is shown in FIG. 4B. The assignment data file contains the file content corresponding to each assignment command in the command buffer having a data input argument. As illustrated, the sample data file may contain uncompressed data 96, 98 for multiple destination files, or compressed data 100A, 100B.

As an example of creating an assignment to carry out a content update, the CCM first generates a unique sequence number for the new assignment, and opens a new buffer (or file) to hold the commands and data. The basic commands are largely dictated by the available functionality of the Content Mover. The CCM obtains the file list/delta table and adds commands to create any new directories as necessary. The content itself is then assessed to determine which portions may be non-compressible, compressible, compressible deltas, or non-compressible deltas, and appropriate commands and corresponding data files are added to the buffer. The types of files that are deemed non-compressible are specified by the administrator at the policy management console 20. The CCM then calculates the space that will be required on the server to carry out the assignment. In an illustrative embodiment, an assignment can be up to 4 Gbytes of commands and data. The assignment is then marked as "ready" and queued for delivery by the CCM transport service 80.

The transport service 80 operates in four phases: discovery, global distribution, local distribution, and status reporting. During discovery mode, information is collected from the network elements regarding the connectivity and abilities of the group leaders and their corresponding backend servers. Discovery mode is a continuous process and a given content move is based upon the latest network "discovered". Discovery begins at the network segment level whereby a group leader is elected by the servers in each cluster. The group leaders are then arranged into an appropriate tree structure by the CCM, and all of the backend servers are arranged into their administratively determined content groups. A content group is a set of backend servers that receives the same content, e.g., by file types, ownership, locations or service level being offered to the subscribers or to the users.

Dynamic system discovery of the content mover system at the remote segment level provides the ability to automatically handle server outages or network reconfigurations. For example, if there are five backend servers in a cluster at a site, one or more could be out of service or occupied for functions unrelated to outward content distribution (e.g. dedicated intranet offline testing). As load-balancing and service level imperatives are periodically addressed (perhaps automatically), the number of available servers at a given site can increase or decrease. The content mover system requires a designation of a group leader at each network segment (i.e., cluster) to handle the store-and-forward to other sites, to handle local distribution of content to the other backend servers, and to provide site reports back to the CCM. A group leader may be pre-assigned for administrative purposes, or it may be dynamically chosen. Such a dynamic designation is carried out automatically through a constantly running process known as "election," detailed as follows.

Each server within a local cluster that is configured to be capable of being a group leader participates in a continuous voting scheme. There may be a list of pre-assigned leaders, or each configured server can be allowed to participate in the voting. The current GL notifies each member in the group with a periodic, non-connection, multicast, User Datagram Protocol (UDP) message, "Leader Alive" (LA), on an agreed "Control Channel," which is distinct from transactions using the agreed "Data Channel." The Control Channel is a Multicast IP and port number combination that all Network segment members listen to. The GL can instruct all members to change their control channel. The Data Channel is a Multicast IP address and port combination that members of Content Group are instructed to listen to. Each GL keeps a list of "Content Group" members, as configured in the CCM. Each Content Group member joins a specific Data Channel (i.e., transmits and receives controls on the Channel). The GL sends assignments to the Data Channel corresponding to its list of Data Channels for a Content Group.

If any server fails to observe the LA messages for a configurable period, then such a server initiates a new election. In its simplest form, the first server to correctly notice the leader is dead and to claim leadership, via an issued "Leader Claim" message, becomes the new leader. If no other server sends a Leader Claim message (LC) to the group within a preset time, then the vote is over, and the new leader sends its own LA messages to the group. However, each GL candidate may have different priorities, i.e., one may be administratively deemed preferable over another. Where multiple servers determine that the LA messages have stopped, each may attempt to send a Leader Claim (LC) message before receiving an LC message from any other candidate, and a finite state mechanism is required for resolving these conditions deterministically.

Figure 5:
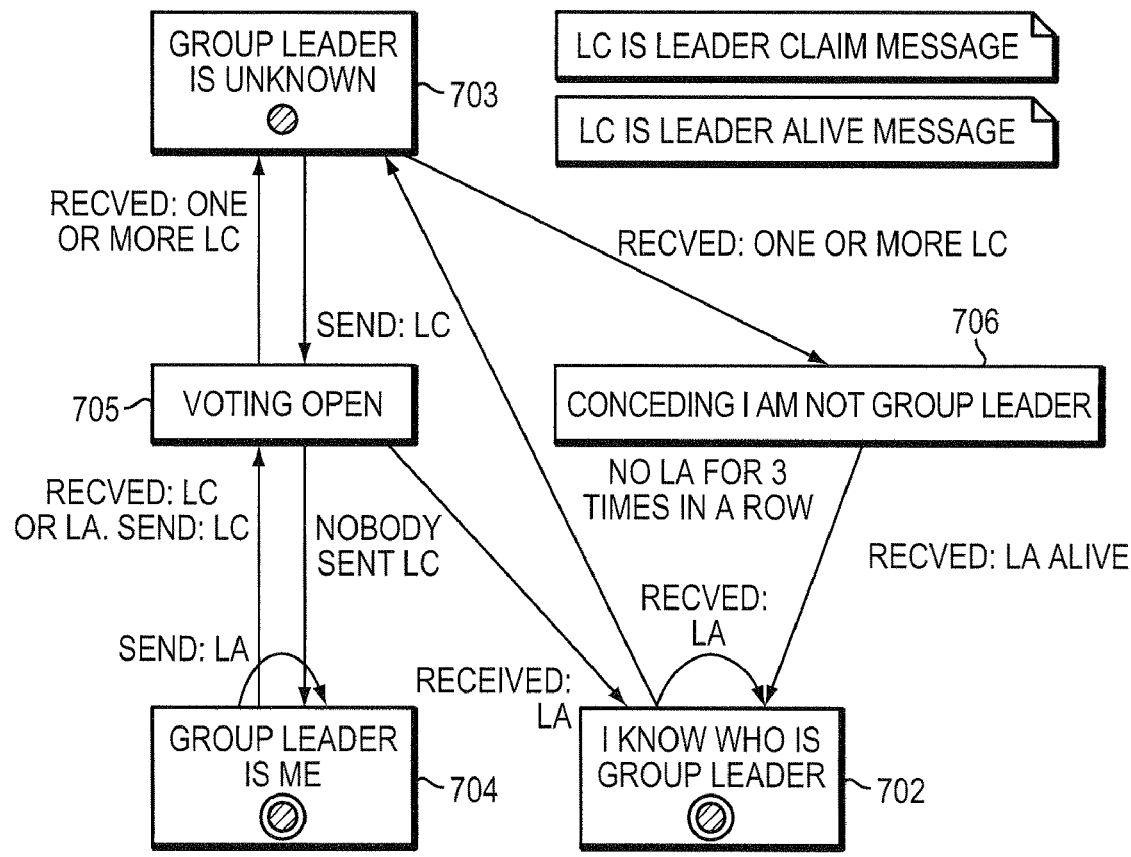
FIG. 5 is a diagram of an illustrative finite state machine for group leader elections according to the invention.

This general process can be diagramed as shown in FIG. 5 for the operations defining the five separate states of each participating server: GL known, GL unknown, GL is me, voting open, or conceding to another candidate. Voting is done by sending an LC message, with a priority claim, and at an interval determined by how strong a claim the candidate has on becoming the GL. For example, a recently deposed GL may have the best claim and send the LC message faster than any other candidate could possibly send. This might be the case where a GL was only temporarily too busy to send an LA message, or a server missed three LAs, or the LAN was too busy to allow transmission. An illustrative embodiment uses 5 seconds as the minimum time. Other useful selection criteria include: the number of members the former GL knows about, the candidate's computing, storage, and network resources available at the server, how reliable the server has been, and the amount of recent content a server has acquired (i.e., a newcomer may need to reserve resources for getting its content updated). An initial LC period can also be arbitrarily assigned to be any number larger than the minimum time for the current GL to reclaim an inadvertently lost GL status. In an illustrative embodiment, this value is set to 10 seconds.

As shown in FIG. 5, the normal state of GL known 702 terminates when no LA is heard, and leads to the GL unknown state 703. If an LC is heard before sending an LC, then the concession state 706 is entered, pending an LA from the new leader, at which point GL is known 702. On the other hand, if GL is unknown 703, and the server is first to send an LC, then the state is voting open 705, including a configurable timeout period, for example, in the range of 10 to 15 seconds. Transition from this state depends only on whether another LC is received or not during the timeout. If not, then GL is me 704, and an LA is sent. But if another LC is heard during voting open 705 period, then GL is again unknown 703. Even if the server sends LA, another server could also send LA or LC. Rather than have a battle of LA, the server in GL is me 704 sends an LC and moves back into voting is open 705 and again waits to hear another LC. Again, if another LC is heard, then GL is unknown 703, and if no LC is heard in the open 705 timeout period, then the machine enters the GL is me state 704 again, and begin sending periodic LA messages.

Once the GL is elected, i.e., there are no more LC messages in the cluster, the new GL expects a new registration message from each member of the group. A server registration message includes a server's IP address, name, and other information. However, given the possible transmission collisions in the LAN segment, some registration messages may not be initially received by the GL. The GL resolves this by multicasting a report on the control channel of all the servers it believes are registered. This report is sent after an initial delay of approximately 3-5 seconds after the last received report. Any server wanting to register but failing to find its name on the multicast GL report, waits a short, randomly determined period and again sends a registration request. In an illustrative embodiment, the interval is comprised of a random element of up to 1 second. This registration message could also have been lost by collision, so after a configurable time out period, the GL retransmits the (updated) report and again waits to hear more registrations. The registration process eventually stabilizes with no new registrations omitted.

The GL now has a complete list of all servers participating in content distribution within that network segment or cluster. The GL reports this information, along with its own IP address, location (e.g., time zone) and other information, such as Network Segment name/id to the CCM. The CCM updates the database used for tracking network status, and updates the list of members that are available to participate in the content groups. The list of GLs and their constituent backend servers is now ready for global distribution of content.

Given a large list of GLs, having different numbers of servers, and located in different places, an essential element for efficient distribution is to create an ordered list of GLs necessary for service to each content group. Thus, one list might quickly move current U.S. stock market data updates, where another list might be used for moving daily wholesale availability updates to catalog servers. Jobs using each type of list can overlap and assignment conflicts can be resolved in the distribution scheduler.

The content mover system adopts a basic tree-structure for global distribution, where a first set of GLs is expected to propagate information to a number of other GLs. Of course, a simple star is a "tree" in which all GLs are served directly from the CCM, and this may be appropriate where only a small number of GLs are needed for the job. The more interesting problem is where there are literally thousands of servers, spread over hundreds of different far-flung sites, all needing the same instantaneous updates. During the global distribution phase, the CCM delivers the assignments to the group leaders using a reliable point-to-point protocol such as FTP, or Hypertext Transport Protocol (HTTP). Because the TCP/IP protocol stack is part of nearly all popular operating systems, initial development is simplified by using protocols based upon TCP/IP. The group leaders then further distribute the assignments to other group leaders using the store-and-forward method described below.

The CCM will construct a list of the GLs that have reported in the most recent phase of discovery. The GLs will report information to the CCM such as their specific IP address, number of members registered in the group IP addresses of the BESs, free disk space, CPU power, and number of network connections. The list of GLs will be sorted and ordered according to location, performance and distance parameters, as well as speed and reliability of the network connection to the GL. In an illustrative embodiment, the GL list is sorted according to the CPU power (fastest first) and the location, such as timezone or other physical location indicator. There is a GUI mechanism to allow a system administrator to override (or configure) this behavior and artificially define a static behavior for organization of the distribution sequence. It should be apparent that GLs can be identified by their IP addresses or by another naming convention which maps to the corresponding IP address of the GL, such as "Boston," "London". The system administrator will be able to enter and modify the name of the network segment that the GL is in. If the GL in the network segment changes, the network segment name remains the same.

Figure 6:
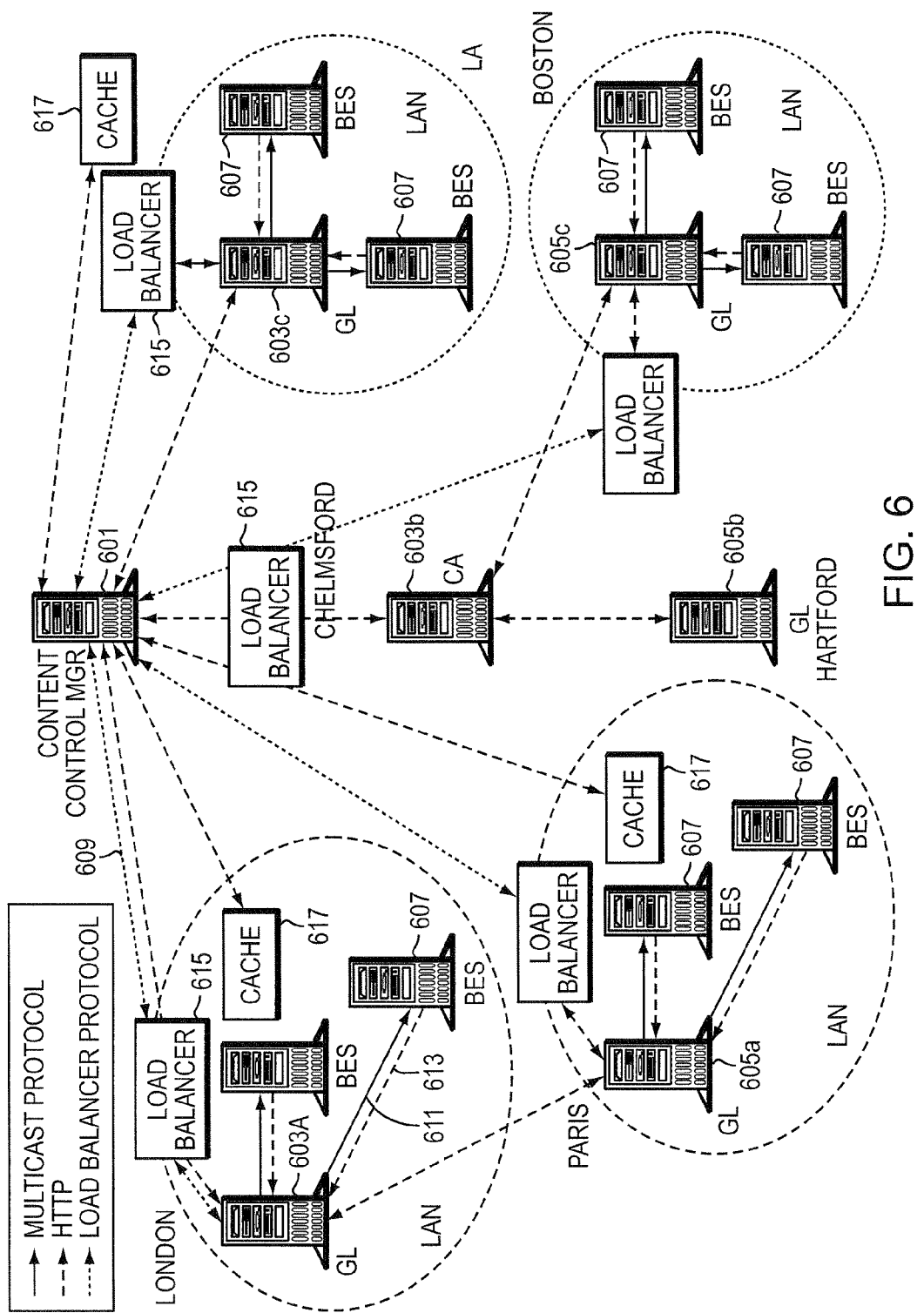
FIG. 6 is a system overview of a tree distribution system III an illustrative embodiment of the invention.

Store-and-forward requires that GLs share the work in distributing assignments (commands and data) to the more "remote" sites, i.e., further down the tree. As shown in FIG. 6, the CCM is at the root 601 of a distribution tree comprised of a plurality of GLs 603, 60S, at varying distances from the root 601. "Distance" is measured as the number of store and forward steps it takes to move an assignment from the CCM to a GL. Each GL at a first defined tree distance from the root, e.g., 603A, 603B, 603C, are required to forward assignments further along the tree to each GL at a further tree distance from the root, e.g., 60SA, 60SB, 60SC. In a larger tree, additional limbs are added as necessary to reach each GL efficiently.

Since the nature of IP is to send independent packets for routing to their destinations by the best available route, as determined by the routers, certain assumptions can be made regarding the average "distance" at any given time. A viable distance spanning tree can be derived for efficiently distributing assignments to any combination of remote GLs that supervise the distribution to the targeted backend servers.

The CCM constructs a tree using the sorted list of GLs. Each GL is responsible for distributing an assignment to other GLs first and later to its own members. Assignments are sent from the CCM to a GL or from one GL to another using a reliable point-to-point protocol 609, such as HTTP.

To initiate a distribution, the CCM sends a notification message to the first GL in the list that an assignment is to be obtained from the CCM. A notification message includes the address of a server from which the GL is to obtain a copy of the assignment and the address of the GL to which the notification should be forwarded. Each GL receives notification from the CCM, or from another GL. The GL then gets a copy of the assignment from the specified location (GL or CCM) and contacts the CCM for the notification to forward to the next GL. The GL then sends the notification to the next GL. Once a GL has stored a copy of the assignment (i.e., it was earlier in the CCM list of GLs), the GL can forward copies to other GLs occurring later in the distribution list.

When the CCM transmits a notification, it contains an indication whether the GL is the last on the list. If not the last on the list, the GL requests another GL address from the CCM for forwarding the assignment. The CCM will continue handing out the GL addresses from its sorted list of GLs until all GLs have received the assignment. All GLs that have not already done so will then distribute the assignments to their group members. Communications between each GL and the members of its group is carried out using a combination of a point-to-point protocol 613 and a reliable multicast protocol 611 described below.

Figure 7:
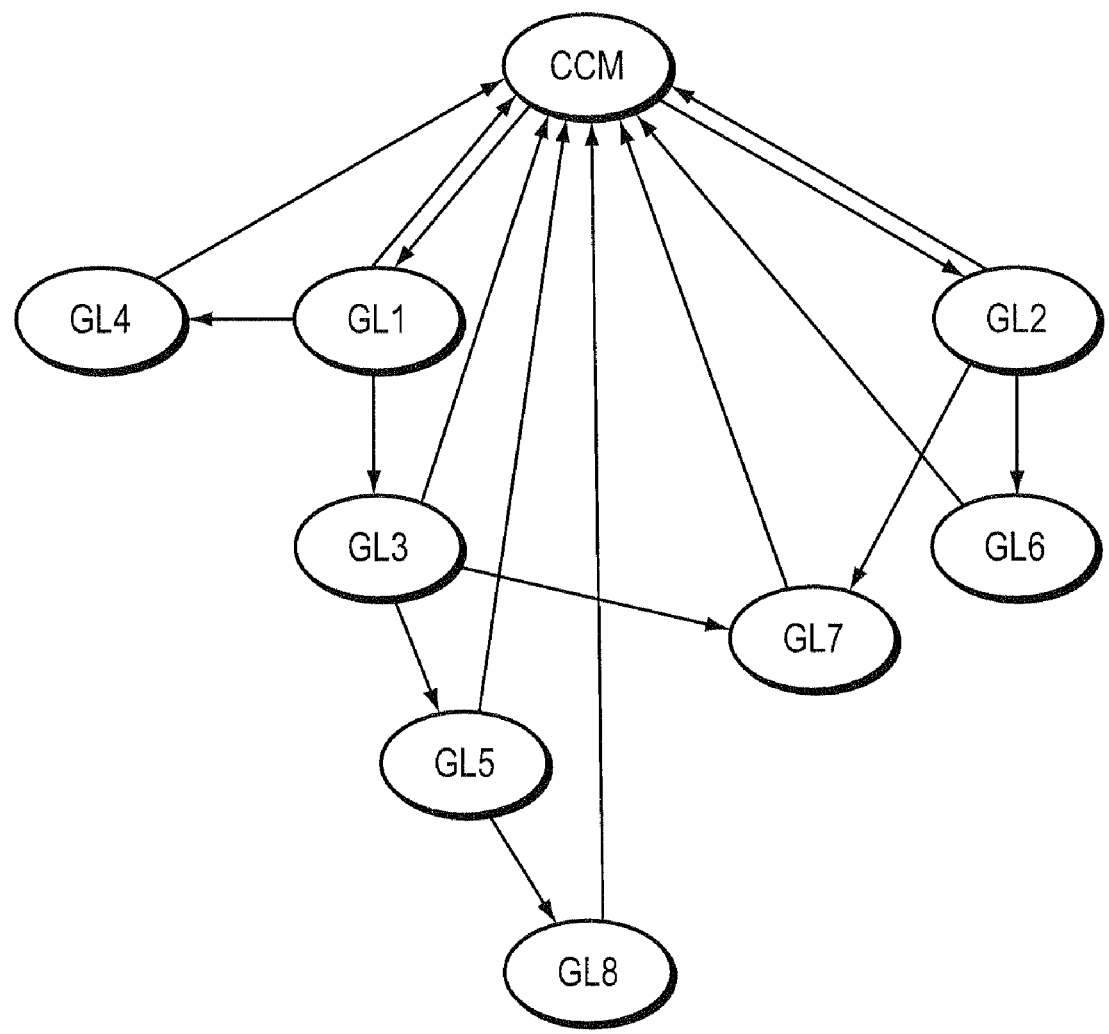
FIG. 7 is a diagram for illustration of a store-and-forward distribution tree according to the invention.

FIG. 7 illustrates one example of store-and-forward distribution using a tree, the operation of which will now be explained. In the example, every GL must receive the same assignment, and it would be inefficient to rely upon the CCM to individually contact each GL in seriatim. The transmission power of all available GLs can be used to dramatically amplify the replication of the assignment issued by the CCM if each GL is given a copy and access to the dynamic list of other GLs to send it to. First, the CCM selects GL1 as the first recipient, and transmits a notification and an assignment to GL1 with an address for GL3. In an illustrative embodiment, the assignment is "requested" by the GL1 after it receives the notification. GL1 forwards the assignment to GL3 and GL1 requests the next GL address from the CCM. While GL1 was busy sending the assignment to GL3, the CCM also sent a copy to GL2, requesting that it be forwarded to GL6. When ready, GL1 requests the next address from the CCM and is told GU needs the assignment. GL4 receives the notification from GL1 and requests the copy of the assignment. GL1 copies its assignment to GU. GL3 has also finished storing the assignment it received from GL1 and also requests the next GL from the CCM. During the creation of the distribution tree, the CCM can quickly determine whether it would be better to have GL2 or GL3 service GL7, and, in the case of this example, decides that GL3 should next forward a copy to GL5 instead. The distribution process continues until all necessary GLs have received a copy of the assignment and each GL has received notice from CCM that no more GLs require a copy (e.g., a null address in the forwarding address of the notification message). Each GL then forwards the assignment to at least some of its servers which make the necessary content interpretations according to the instructions in the assignments.

The mechanism for distribution of assignments from a GL to the back end servers is implemented with a lightweight and reliable multicast protocol. This is referred to as "local distribution" from the GL to the servers. Content assignments are administratively divided into different types of transactions based upon distribution content. The GL uses the Data Channel for distributing assignments and for receiving acknowledgements and reports from the servers. An optional encryption algorithm, as known in the art, can be used in this protocol. It could be used to further increase information security, and to prevent unauthorized systems from participation in the leader election process previously described herein.

A GL determines whether the assignment can be forwarded in one block (e.g., 8 Kbytes), and establishes a temporary "session" for larger assignments. To establish a session, the GL announces to a group that a session is starting, including information about the ID, size, and name of the assignment being sent, as well as the transfer rate and frame size used. Each member that receives the announcement determines if it needs the assignment and either replies with a completion signal or silently participates in the referenced session. If the GL receives completion signals from all participants, then it knows that all servers have already received the assignment, otherwise it assumes that at least one server needs the assignment. The session information sent by the GL can also be sent in the same message as the periodic "LeaderAlive" messages to the group, in order to further conserve LAN bandwidth.

A group member that has been assigned to participate in a data transfer session will begin to listen for data packets from the GL on the Data Channel. The GL breaks the data into frames of a predetermined size (e.g., 4 Kbytes), in accordance with the frame size in the session announcement. Each packet sent by the GL through the multicast UDP contains at least the following information: the Content Assignment ID, a retransmission count, a frame sequence number, and data size. Each receiver checks the frame sequence numbers as each packet is received, and collects a list of missing frame numbers in the received sequence.

After transmission of an entire session, each member participating in the distribution generates and unicasts a status report. The report comprises a list of lost packet numbers, i.e., a Negative Acknowledgement, or NACK. If no packets were lost, then the report contains an empty list, and is interpreted as being a positive acknowledgement for that member. In an illustrative embodiment, the time after transmission for generation of a status report is up to approximately one second. The GL receives the status reports and retransmits the missing frames.

During retransmission of the requested frames, the GL (sender) may retransmit missing frames as each subsequent NACK is received, or it may continue sending data and accumulate a new list of lost frames. The number of NACK messages may be considered as a factor in adjustment of the GL transmission rate. When the GL reaches the end of the data (e.g., a session), it reviews the blocks in the list of NACKs and retransmits only the missing blocks. This delay of retransmission further reduces network traffic and is called NACK aggregation. Alternatively, a NACK can be sent after a predetermined time, rather than waiting for transmission of an entire session.

Each block transmission includes a retransmission count generated by the GL, initially set to one, and incremented for each retransmission in response to further NACKs. The retransmission or pass number is used by a Group Member to find lost frames. The GL continues to retransmit blocks in response to NACKs until it gets the status reports from all or a quorum number of all participating BESs. This signifies that each participant has received each block, up to and including the final block. Once a group member has received a complete session of data, i.e., an assignment, the assignment is passed to the local content interpreter.

The content interpreter running in each back-end server, parses the received assignment and interacts with the BES operating system to carry out the instructions of each assignment on each addressed backend server. The content interpreter converts the assignment instructions into commands and corresponding parameters and sends them to the operating system of the server. Examples of standard commands are "create a directory with the following path name and permissions," and "create a file with the following compressed contents." The content interpreter then interprets the response codes from the operating system and creates reports of assignment completion. Once an assignment is completed, the content interpreter sends its report to the Group Leader.

Each registered group member participating in a content move must send a job status report for each assignment it receives. The report may be sent either using user Datagram Protocol UDP or Transmission Control Protocol TCP. The Group Leader sends a unicast request to any participating group member who did not report or whose response was lost. If the number of missing reports exceeds a configurable number such as half the number of group members, then the GL sends a multicast request on the LAN, including a list of group members. If there are fewer servers that have not reported than have reported, the GL sends the list of those whose reports are missing. Otherwise, it sends the list of those whose reports were received. In either case, each server interprets the request and the list and retransmits its own report, if necessary. The GL retransmits its request and corresponding list until each participant has reported or a configurable maximum number of transmission has been reached. Each member transmits its report at a time determined as a random multiple of a predetermined interval on the order of a few seconds. This avoids "report implosion" in which all servers would attempt to reply at the same instant, causing massive transmission collisions and retransmission timeout delays, in which case the reporting process would take much longer to be completed.

When the number of lost frames does not decrease after a configurable number of tries (e.g., ten tries), and the GL does not have a quorum number of reports, then the GL reports a problem to the CCM. Otherwise, the GL forwards a comprehensive assignment completion report to the CCM. The report contains the complete list of servers that have reported successful completion of the assignment. In either case, transmission from GL to CCM is accomplished by using HTTP protocol. The CCM processes each GL report for each assignment, updates its database with assignment status, and optionally logs the reports.

As a final step in carrying out a content distribution job, the CCM synchronize content switchover in all back end servers by sending out another assignment after the content has been successfully distributed. This "commit" assignment is distributed to the GLs and the servers by the same mechanism as any other assignment. Upon receipt, each content interpreter performs the necessary steps as triggered in the commit assignment, such as by swapping directory pointers between the current "live" content and the newly updated content. In an illustrative embodiment, switchover is accommodated in the following way. The directory structure in the "live" directory is replicated in a "temp" directory. Each command in a received assignment causes corresponding directories to be added or removed in the temp directory, and new or modified files added. For any commands to remove a file, an empty file with the deleted filename is added to temp. Upon receipt of the "commit" assignment, a "diff" function copies each file from "live" to "temp" that was not already in "temp" and a list of moved files is saved. The web server is then reconfigured to point to the "temp" directory (e.g., using ISAPI redirection, NSAPI or Apache re-run config), the "live" directory is renamed as "backup", and the "temp" directory is renamed as "live."

Similarly, for a "rollback" assignment, for each file in the list saved during the previous live directory creation, move the file from "temp" to "backup", switch the server to point to "backup" directory, and remove the "live" directory by renaming "backup" directory to "live."

Each server then sends its report to the GL, the GLs send their own reports to the CCM, and the commit status reports are processed and logged by the CCM. The GL Assignment Status Report includes the list of servers that have reported successful completion of the assignment. Another type of reports that the GL sends to the CCM. A Network Segment (NS) Report is sent whenever the GL detects a change to a BES, e.g., when a BES went offline. The CCM updates the database for every report received. The GUI will periodically poll the database and refresh its screens with updated status information.

When a new BES is added to a network segment, the GL will send CCM report. CCM will update the database list of computers. The browser-based User Interface will show the new computer by displaying a new computer icon for this entry. The administrator then needs to add this computer to one or more content groups. The scheduler will note the change, and trigger a Replicate job to be sent to the CCM.

The interface between the Content Mover and external load-balancing systems can be beneficially exploited for reducing distribution overhead, while keeping content "fresh" at essential sites. As illustrated in FIG. 6, the CCM 601 and/or GL 603 will notify any load balancer 615 or virtual resource management (VRM) device when it needs to reduce the load on the group leader for a content assignment. The load balancer or VRM may also be notified to add or remove any of its network resources (603, 605, 607) from rotation while an update is in progress. The network resources may be added or removed in groups or one at a time. Some examples of why this may occur include the case wherein the CCM or GL determined that content on a particular network device is stale, response time for a particular network device is slower than others, or a new device is being added to the content group.

The CCM and/or GL will maintain a list of files currently contained in each network cache 617 on each network segment (e.g., LA, London, Paris, Boston). When a content update occurs, the list of files contained in the cache will be compared, and new content will be automatically distributed to the network cache. This guarantees that content being served from network caches is always up to date and fresh. The update to the cache can be a scheduled update or it can happen automatically. In addition, the CCM and/or GL will send invalidation messages to the cache on each network segment. For third-party compatibility, these messages need not be in the form of a proprietary assignment command, and would be created to conform with third-party specifications.

As a further example of an external interface with Content Mover, the CCM and/or GL will contain replicated information of a search engine and will automatically update the search engine with fresh content, i.e., according to a schedule or when content changes.

Although a distribution server and CCM have been described as being co-resident in a server host, the architecture of the content mover does not preclude one from having multiple CCMs and multiple Distribution Servers operating simultaneously. One application of this alternative embodiment would be for geographical partitioning of management whereby each CCM/distribution server would manage its own GL distribution list. Furthermore, most (if not all) of the individual components illustrated as being implemented within the distribution server 18, in FIG. 2, such as the Gill 64, logger 66, scheduler 60, database manager 68, and database 22, can each be implemented in a distributed fashion across multiple computers connected via a communication network.

Similarly, although the invention describes distribution of content to a BES in a distributed network, it should be noted that the Content Mover can distribute data of any type to caches or any other network device on any distributed network or wireless network, including, but not limited to satellite.

Although the group leader has been described in an illustrative embodiment as a remote element in the system such as a separate computer server 26A, it will be appreciated that in an alternative embodiment, a group leader may also be hosted on the same computer hosting the distribution server 16. This alternative arrangement facilitates use of a GL to serve a local cluster of servers 24A. It should be apparent that this alternative will also require corresponding changes to simplify the protocols used to exchange data between the distribution server and the GL. Similarly, a group leader may share hosting with a backend server's distribution agent (and its content interpreter). This would be convenient where the host server is well adapted to be a content server as well as a group leader, and also permits better dynamic load balancing among all hosts in the web farm cluster, regardless of which server is currently operating as the GL.

While automated processes are described herein for configuration of clusters, it should be appreciated that in an alternative embodiment, the selection of a Group Leader, identification of live servers, and allocation of live servers to content groups can all be done manually, or using a combination of existing tools and network utilities known in the art. For example, a single Internet Control Message Protocol, ICMP "ping" (echo) message and response may be sufficient to determine which servers are live, and a CCM script with a list of IP addresses of every possible server could slavishly ping each server, resulting in a list of live servers. Similarly, network distances can be roughly measured using ping, or more sophisticated performance measurement tools for end-to-end delay.

It will be appreciated by one skilled in the art that a content interpreter (CI) can be customized to interpret assignment commands into compatible commands for the particular operating system running on any BES. This offers enhanced portability as the content mover can handle distribution to any kind of host computer for which an appropriate CI has been crafted.

It will be appreciated by one skilled in the art that although the content mover has been described for distribution of passive file contents, it will also be useful in mass distribution of application files (executables), configuration information, or registry settings necessary to install new executables onto a BES, a cache, or any other network or wireless device on a distributed network. Similarly, the invention can be adapted for distribution of configuration updates for existing applications. The Assignment Creator and content interpreters would be modified as necessary to implement such additional commands to the BES, and to obtain the requisite status reports and log them appropriately.

Although the invention has been shown and described with respect to illustrative embodiments thereof, various other changes, omissions and additions in the form and detail thereof may be made therein without departing from the spirit and scope of the invention.

What is claimed is:

1. A method for distributing information to a plurality of servers, comprising:
   maintaining, by a control manager server, a list of group leader servers;
   sorting, by a processor, the list of group leader servers in an order to receive the information in accordance with selected factors;
   transmitting the information from the control manager server to a first group leader server, the information comprising first instructions to the first group leader server for transmitting the information to a second group leader server;
   transmitting by the first group leader server, in response to the first instructions, the information to the second group leader server;
   requesting by the second group leader server second instructions from the control manager server;
   transmitting by the second group leader server, in response to the second instructions, the information to a further group leader server; and
   transmitting by the first group leader server the information to back end servers belonging to a group of the first group leader server, and transmitting by the second group leader server the information to back end servers belonging to a group of the second group leader server, and transmitting by the further group leader server the information to back end servers belonging to a group of the further group leader server.

2. A system of servers to distribute information, comprising:
   a control manager server configured to maintain a list of group leader servers;
   a processor executing on the system configured to sort the list of group leader servers in an order to receive the information in accordance with selected factors;
   the control manager server further configured to transmit the information to a first group leader server, the information comprising first instructions to the first group leader server for transmitting the information to a second group leader server;
   the first group leader server configured to transmit, in response to the first instructions, the information to the second group leader server;
   the second group leader server configured to request second instructions from the control manager server;
   the second group leader server further configured to transmit, in response to the second instructions, the information to a further group leader server; and
   the first group leader server further configured to transmit the information to back end servers belonging to a group of the first group leader server, and the second group leader server further configured to transmit the information to back end servers belonging to a group of the second group leader server, and the further group leader server configured to transmit the information to back end servers belonging to a group of the further group leader server.

3. A computer readable storage media containing executable program instructions executed by a processor, comprising:
   program instructions that maintain, by a control manager server, a list of group leader servers;
   program instructions that sort the list of group leader servers in an order to receive information in accordance with selected factors;
   program instructions that transmit the information from the control manager server to a first group leader server, the information comprising first instructions to the first group leader server for transmitting the information to a second group leader server;
   program instructions that transmit by the first group leader server, in response to the first instructions, the information to the second group leader server;
   program instructions that request by the second group leader server second instructions from the control manager server;
   program instructions that transmit by the second group leader server, in response to the second instructions, the information to a further group leader server; and
   program instructions that transmit by the first group leader server the information to back end servers belonging to a group of the first group leader server, and program instructions that transmit by the second group leader server the information to back end servers belonging to a group of the second group leader server, and program instructions that transmit by the further group leader server the information to back end servers belonging to a group of the further group leader server.

4. A method for distributing information to a plurality of servers, comprising:
maintaining, by a control manager server, a list of group leader servers;
sorting, by a processor, the list of group leader servers in an order to receive the information in accordance with selected factors;
transmitting the information from the control manager server to a first group leader server;
transmitting, by the first group leader server, the information to a second group leader server;
requesting, by the second group leader server, instructions from the control manager server; and
transmitting by the second group leader server, in response to the instructions, the information to a further group leader server.

5. The method as in claim 4, further comprising:
transmitting by the first group leader server the information to back end servers belonging to a group of the first group leader server, and transmitting by the second group leader server the information to back end servers belonging to a group of the second group leader server, and transmitting by the further group leader server the information to back end servers belonging to a group of the further group leader server.

6. The method as in claim 4, further comprising:
transmitting instructions by the control manager server to the first group leader server.

7. The method as in claim 6, further comprising:
including the instructions with the information transmitted to the first group leader server.

8. A system of servers to distribute information, comprising:
a control manager server configured to maintain a list of group leader servers;
a processor executing on the system configured to sort the list of group leader servers in an order to receive the information in accordance with selected factors;
the control manager server further configured to transmit the information to a first group leader server;
the first group leader server configured to transmit the information to a second group leader server;
the second group leader server configured to request instructions from the control manager server; and
the second group leader server further configured to transmit, in response to the instructions, the information to a further group leader server.

9. The system of servers of claim 8, further comprising:
the first group leader server further configured to transmit the information to back end servers belonging to a group of the first group leader server, and the second group leader server further configured to transmit the information to back end servers belonging to a group of the second group leader server, and the further group leader server configured to transmit the information to back end servers belonging to a group of the further group leader server.

10. The system of servers of claim 8, further comprising:
the control manager server further configured to transmit instructions to the first group leader server.

11. The system of servers of claim 10, wherein the instructions comprise the information transmitted to the first group leader server.

12. A computer readable storage media containing executable program instructions executed by a processor, comprising:
program instructions that maintain, by a control manager server, a list of group leader servers;
program instructions that sort the list of group leader servers in an order to receive information in accordance with selected factors;
program instructions that transmit the information from the control manager server to a first group leader server;
program instructions that transmit the information from the first group leader server to a second group leader server;
program instructions that request, by the second group leader server, instructions from the control manager server; and
program instructions that transmit the information from the second group leader server, in response to the instructions, to a further group leader server.

* * * * *

UNITED STATES PATENT AND TRADEMARK OFFICE
CERTIFICATE OF CORRECTION

PATENT NO. : 7,747,741 B2  Page 1 of 1
APPLICATION NO. : 12/046198
DATED : June 29, 2010
INVENTOR(S) : Vijay R. Basani It is certified that error appears in the above-identified patent and that said Letters Patent is hereby corrected as shown below:

In the Specifications

In col. 6, line 19 should read:
Before or while ~~canying~~ carrying out its own assignment, the first In col. 6, line 26 should read:
distribute the assignment to their ~~conesponding~~ corresponding BESs. This Signed and Sealed this
Tenth Day of December, 2013

Margaret A. Focarino
*Commissioner for Patents of the United States Patent and Trademark Office*